US009838957B2

(12) United States Patent
Sirotkin et al.

(10) Patent No.: US 9,838,957 B2
(45) Date of Patent: Dec. 5, 2017

(54) APPARATUS, SYSTEM AND METHOD OF SELECTING A MOBILITY MODE OF A USER EQUIPMENT (UE)

(71) Applicant: INTEL CORPORATION, Santa Clara, CA (US)

(72) Inventors: Alexander Sirotkin, Giv'on Hachadasha (IL); Jing Zhu, Portland, OR (US); Nageen Himayat, Fremont, CA (US)

(73) Assignee: INTEL CORPORATION, Santa Clara, CA (US)

(*) Notice: Subject to any disclaimer, the term of this patent is extended or adjusted under 35 U.S.C. 154(b) by 138 days.

(21) Appl. No.: 14/670,438

(22) Filed: Mar. 27, 2015

(65) Prior Publication Data

US 2016/0135120 A1 May 12, 2016

Related U.S. Application Data

(60) Provisional application No. 62/076,361, filed on Nov. 6, 2014.

(51) Int. Cl.
*H04W 4/00* (2009.01)
*H04W 48/18* (2009.01)
*H04W 48/14* (2009.01)
H04W 88/06 (2009.01)
H04W 84/04 (2009.01)
H04W 84/12 (2009.01)

(52) U.S. Cl.
CPC ........... *H04W 48/18* (2013.01); *H04W 48/14* (2013.01); *H04W 84/042* (2013.01); *H04W 84/12* (2013.01); *H04W 88/06* (2013.01)

(58) Field of Classification Search
CPC ...... H04W 48/18; H04W 48/16; H04W 48/06
USPC .......................................................... 370/329
See application file for complete search history.

(56) References Cited

U.S. PATENT DOCUMENTS

| 2014/0040504 A1 | 2/2014 | Gupta |
| 2014/0233386 A1 | 8/2014 | Jamadagni et al. |
| 2014/0293982 A1 | 10/2014 | Gupta |
| 2014/0351880 A1* | 11/2014 | Low .......................... H04L 63/20 726/1 |
| 2015/0334724 A1* | 11/2015 | Faccin .................. H04W 48/16 370/235 |

FOREIGN PATENT DOCUMENTS

| WO | 2014130091 | 8/2014 |
| WO | 2014158274 | 10/2014 |

OTHER PUBLICATIONS

International Search Report and Written Opinion for PCT/US2015/054160, dated Feb. 23, 2016, 20 pages.
(Continued)

*Primary Examiner* — Mang Yeung
(74) *Attorney, Agent, or Firm* — Shichrur & Co.

(57) ABSTRACT

Some demonstrative embodiments include devices, systems and methods of selecting a mobility mode of a User Equipment (UE). For example, a UE may include a Wireless Local Area Network (WLAN) transceiver; a cellular transceiver to communicate with a cellular node; an Access Network Discovery and Selection Function (ANDSF) client module to communicate with an ANDSF server; and a controller to select a WLAN mobility mode from a cellular/WLAN aggregation mode and an ANDSF mode.

16 Claims, 4 Drawing Sheets

(56) References Cited

OTHER PUBLICATIONS

3GPP TS 36.300 V11.7.0 (Sep. 2013); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); Sep. 2013, 209 pages.
3GPP TS 36.331 V11.5.0 (Sep. 2013); 3rd Generation Partnership Project; Technical Specification Group Radio Access Network; Evolved Universal Terrestrial Radio Access (E-UTRA); Radio Resource Control (RRC); Protocol specification (Release 11); Sep. 2013; 347 pages.
3GPP TS 24.302 V12.3.0 (Dec. 2013); 3rd Generation Partnership Project; Technical Specification Group Core Network and Terminals; Access to the 3GPP Evolved Packet Core (EPC) via non-3GPP access networks; Stage 3 (Release 12); Dec. 2013; 83 pages.
3GPP TS 25.304 V11.4.0 (Sep. 2013); 3rd Generation Partnership Project; Technical Specification Group Radio Access Network; User Equipment (UE) procedures in idle mode and procedures for cell reselection in connected mode (Release 11); Sep. 2013; 54 pages.
3GPP TS 23.402 V12.3.0 (Dec. 2013); 3rd Generation Partnership Project; Technical Specification Group Services and System Aspects; Architecture enhancements for non-3GPP accesses (Release 12); Dec. 2013; 288 pages.
3GPP TS 24.312 V12.3.0 (Dec. 2013); 3rd Generation Partnership Project; Technical Specification Group Core Network and Terminals; Access Network Discovery and Selection Function (ANDSF) Management Object (MO) (Release 12); Dec. 2013; 249 pages.
3GPP TS 25.331 V11.7.0 (Sep. 2013); 3rd Generation Partnership Project; Technical Specification Group Radio Access Network; Radio Resource Control (RRC); Protocol specification (Release 11); Sep. 2013; 2086 pages.
International Preliminary Report on Patentability for PCT/US2015/054160, dated May 18, 2017, 7 pages.

\* cited by examiner

APPARATUS, SYSTEM AND METHOD OF SELECTING A MOBILITY MODE OF A USER EQUIPMENT (UE)

CROSS REFERENCE

This application claims the benefit of and priority from U.S. Provisional Patent Application No. 62/076,361 entitled "LTE/WLAN Aggregation Coexistence with ANDSF", filed Nov. 6, 2014, the entire disclosure of which is incorporated herein by reference.

TECHNICAL FIELD

Some embodiments described herein generally relate to selecting a mobility mode of a User Equipment (UE).

BACKGROUND

A wireless communication device, e.g., a mobile device, may be configured to utilize multiple wireless communication technologies.

For example, a User Equipment (UE) device may be configured to utilize a cellular connection, e.g., a Long Term Evolution (LTE) cellular connection, as well as a wireless-local-area-network (WLAN) connection, e.g., a Wireless-Fidelity (WiFi) connection.

There exists a need for solutions to enhance a level of cooperation and/or integration between WLAN and cellular networks.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
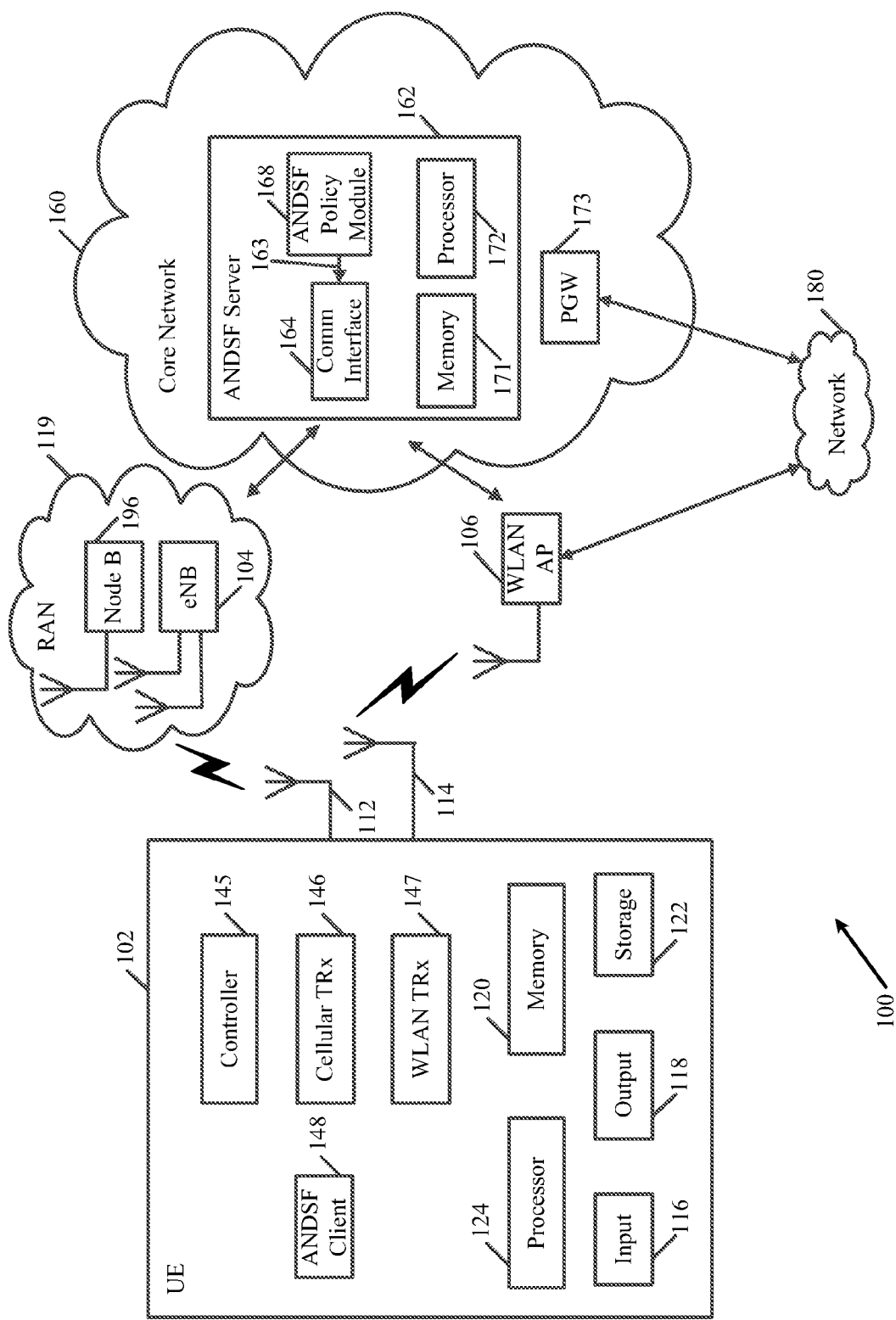
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.300 (*3GPP TS 36.300 V*11.7.0 (2013-09); *Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage* 2 (*Release* 11)); 3GPP TS 36.331 (*3GPP TS 36.331 V*11.5.0 (2013-09);

Technical Specification; 3rd Generation Partnership Project; Technical Specification Group Radio Access Network; Evolved Universal Terrestrial Radio Access (E-UTRA); Radio Resource Control (RRC); Protocol specification (Release 11)); 3GPP TS 24.302 (*3GPP TS 24.302 V12.3.0 (2013-12); Technical Specification; 3rd Generation Partnership Project; Technical Specification Group Core Network and Terminals; Access to the 3GPP Evolved Packet Core (EPC) via non-3GPP access networks; Stage 3 (Release 12)*); 3GPP 25.331 (*3GPP TS 25.331 V11.7.0 (2013-09); Technical Specification; 3rd Generation Partnership Project; Technical Specification Group Radio Access Network; Radio Resource Control (RRC); Protocol specification (Release 11)*); 3GPP TS 25.304 (*3GPP TS 25.304 V11.4.0 (2013-09); Technical Specification; 3rd Generation Partnership Project; Technical Specification Group Radio Access Network; User Equipment (UE) procedures in idle mode and procedures for cell reselection in connected mode (Release 11)*); 3GPP TS 23.402 (*3GPP TS 23.402 V12.3.0 (2013-12); Technical Specification; 3rd Generation Partnership Project; Technical Specification Group Services and System Aspects; Architecture enhancements for non-3GPP accesses (Release 12)*); and 3GPP TS 24.312 (*3GPP TS 24.312 V12.3.0 (2013-12); Technical Specification; 3rd Generation Partnership Project; Technical Specification Group Core Network and Terminals; Access Network Discovery and Selection Function (ANDSF) Management Object (MO) (Release 12)*)), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), WiMax, ZigBee™, Ultra-Wideband (UWB), Global System for Mobile communication (GSM), second generation (2G), 2.5G, 3G, 3.5G, 4G, 4.5G, Fifth Generation (5G) mobile networks, 3GPP, Long Term Evolution (LTE) cellular system, LTE advance cellular system, LTE Unlicensed systems, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMAX cellular network, and the like.

Some demonstrative embodiments are described herein with respect to a WLAN system. However, other embodiments may be implemented in any other suitable non-cellular network.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information and/or signals via one or more wireless mediums, for example, a radio channel, a cellular channel, an RF channel, a Wireless Fidelity (WiFi) channel, an IR channel, and the like, e.g., as described below. One or more elements of system 100 may optionally be capable of communicating over any suitable wired communication links.

In some demonstrative embodiments, system 100 may include at least one User Equipment (UE) 102 capable of communicating with one or more wired networks 180 via at least one Radio Access Network (RAN) 119, and/or via at least one non-cellular network, e.g., as described below.

In some demonstrative embodiments, UE 102 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an Internet of Things (IoT) device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, networks 180 may include one or more Packet Data Networks (PDNs). For example, networks 180 may include an Internet network, an IP Multimedia Core Network Subsystem (IMS) network, and/or any other PDN. In other embodiments, networks 180 may include any other suitable additional and/or alternative network.

In some demonstrative embodiments, RAN 119 may include one or more cells controlled by one or more cellular nodes ("nodes"). For example, RAN 119 may include an evolved Node B (eNB) 104, a Node B 196, and/or any other cellular node, e.g., a Base Station (BS), a Base Transceiver Station (BTS), and the like.

In some demonstrative embodiments, eNB 104 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In some demonstrative embodiments, system 100 may include a non-cellular network, for example, a WLAN, e.g., a Basic Service Set (BSS), managed by a WLAN Access Point (AP) 106.

In some demonstrative embodiments, the non-cellular network may at least partially be within a coverage area of RAN 119. For example, AP 106 may be within a coverage area of eNB 104.

In some demonstrative embodiments, system 100 may also include a Core Network (CN or CNW) 160, which may be configured to provide one or more services to UE 102, and/or to setup and/or manage communication between UE 102 and RAN 119 and/or networks 180, e.g., as described below.

In some demonstrative embodiments, CN 160 may include one or more PDN Gateways (PGWs) 173 to support a PDN connection between UE 102 and a PDN of network 180.

In some demonstrative embodiments, a PGW 173 may be associated with an Access Point Name (APN). UE 102 may utilize the APN of a PGW 173, for example, to facilitate a connection to network 180 via the PGW 173.

In some demonstrative embodiments, core network 160 may include an Access Network Discovery and Selection Function (ANDSF) server 162, which may be configured to assist UE 102 in communicating with and/or steering between one or more steering traffic between Radio Access Technology (RAT) networks, for example, RAN 119 and/or WLAN AP 106, e.g., as described below.

In some demonstrative embodiments, ANDSF server 162 may include an ANDSF policy module 168 to determine one or more ANDSF Management Objects (MOs) 163 including one or more ANDSF policies, e.g., as described below.

In some demonstrative embodiments, ANDSF policy module 168 may include or may be implemented using suitable circuitry and/or logic, e.g., controller circuitry and/or logic, processor circuitry and/or logic, memory circuitry and/or logic, and/or any other circuitry and/or logic, which may be configured to perform at least part of the functionality of module 168. Additionally or alternatively, one or more functionalities of module 168 may be implemented by logic, which may be executed by a machine and/or one or more processors, e.g., as described below.

In some demonstrative embodiments, ANDSF server 162 may include one or more interfaces to interface between ANDSF server 162 and one or more other elements of system 100, e.g., as described below.

In some demonstrative embodiments, ANDSF server 162 may include a communication interface 164 to communicate the one or more ANDSF MOs 163 to UE 102. For example, interface 164 may communicate the ANDSF MOs 163 via RAN 119 and/or via WLAN AP 106. In one example, interface 164 may include an S14 interface to communicate with UE 102 via as S14 reference point, or any other interface.

In some demonstrative embodiments, UE 102 may include an ANDSF client module 148 configured to communicate with ANDSF server 162. For example, ANDSF client module 148 may be configured to receive from ANDSF server 162 one or more ANDSF policies, e.g., in one or more ANDSF MOs.

In some demonstrative embodiments, the ANDSF policies may include information configured to assist and/or direct UE 102 to communicate with one or more WLANs, e.g., via WLAN AP 106 and/or one or more other WLAN APs.

In some demonstrative embodiments, UE 102, eNB 104, WLAN AP 106, and/or Node B 196 may include one or more wireless communication units to perform wireless communication between UE 102, RAN 119, AP 106 and/or with one or more other wireless communication devices, e.g., as described below.

In some demonstrative embodiments, UE 102 may include a cellular Transceiver (TRx) 146 to communicate with RAN 119, and a WLAN TRx 147 to communicate with WLAN AP 106.

In some demonstrative embodiments, cellular TRx 146 and/or WLAN TRx 147 may include, or may be associated with, one or more antennas. In one example, UE 102 may include at least two antennas, e.g., antennas 112 and 114, or any other number of antennas, e.g., one antenna or more than two antennas.

In some demonstrative embodiments, antennas 112, and/or 114 may include any type of antennas suitable for transmitting and/or receiving wireless communication signals, blocks, frames, transmission streams, packets, messages and/or data. For example, antennas 112 and/or 114 may include any suitable configuration, structure and/or arrangement of one or more antenna elements, components, units, assemblies and/or arrays. For example, antennas 112 and/or 114 may include a phased array antenna, a dipole antenna, a single element antenna, a set of switched beam antennas, and/or the like.

In some embodiments, antennas 112 and/or 114 may implement transmit and receive functionalities using separate transmit and receive antenna elements. In some embodiments, antennas 112 and/or 114 may implement transmit and receive functionalities using common and/or integrated transmit/receive elements.

In some demonstrative embodiments, cellular TRx 146 and/or WLAN TRx 147 may include one or more wireless transmitters, receivers and/or transceivers including circuitry and/or logic able to send and/or receive wireless communication signals, RF signals, frames, blocks, transmission streams, packets, messages, data items, and/or data.

In some demonstrative embodiments, WLAN TRx 147 may be configured to communicate with AP 106 over a WLAN link, and cellular transceiver 146 may be configured to communicate with RAN 119 over a cellular link.

In some demonstrative embodiments, the WLAN link may include, for example, a Wireless Fidelity (WiFi) link, a Wireless Gigabit (WiGig) link, or any other link. In some demonstrative embodiments, the WLAN link may include, for example, a link over the 2.4 Gigahertz (GHz) or 5 GHz frequency band, the 60 GHz frequency band, or any other frequency band.

In some demonstrative embodiments, cellular TRx 146 may include a multiple input multiple output (MIMO) transmitters receivers system (not shown) including circuitry and/or logic, which may be capable of performing antenna beamforming methods, if desired. In other embodiments, cellular TRx 146 may include any other transmitters and/or receivers.

In some demonstrative embodiments, cellular TRx 146 may include a turbo decoder and/or a turbo encoder (not shown) including circuitry and/or logic for encoding and/or decoding data bits into data symbols, if desired. In other embodiments, cellular TRx 146 may include any other encoder and/or decoder.

In some demonstrative embodiments, cellular TRx 146 may include OFDM and/or SC-FDMA modulators and/or demodulators (not shown) including circuitry and/or logic configured to communicate OFDM signals over downlink channels, e.g., between RAN 119 and UE 102, and SC-FDMA signals over uplink channels, e.g., between UE 102 and RAN 119. In other embodiments, cellular TRx 146 may include any other modulators and/or demodulators.

In some demonstrative embodiments, WLAN TRx 147 may establish a WLAN link with AP 106. For example, WLAN TRx 147 may perform the functionality of one or more STAs, e.g., one or more WiFi STAs, WLAN STAs, and/or millimeter Wave (mmWave) STAs. The WLAN link may include an uplink and/or a downlink. The WLAN downlink may include, for example, a unidirectional link from AP 106 to the one or more STAs. The uplink may include, for example, a unidirectional link from a STA to AP 106.

In some demonstrative embodiments, UE 102 may be configured to utilize a cellular connection, e.g., a Long Term Evolution (LTE) cellular connection, a Universal Mobile Telecommunications System (UMTS) connection or any other cellular connection, to communicate with RAN 119, and a WLAN connection, e.g., a Wireless-Fidelity (WiFi) connection or any other WLAN connection, to communicate with AP 106.

In some demonstrative embodiments, cellular TRx 146 utilize the cellular link between UE 102 and RAN 119 to communicate traffic of one or more PDN connections, e.g., via one or more PGWs 173.

In some demonstrative embodiments, UE 102 may establish one or more bearers, e.g., one or more Evolved Packet-switched System (EPS) bearers, via the one or more PDN connections between UE 102 and one or more PGWs 173.

In some demonstrative embodiments, one or more elements of system 100 may perform the functionality of a HetNet, which may utilize a deployment of a mix of technologies, frequencies, cell sizes and/or network architectures, for example, including cellular, WLAN, and/or the like.

For example, the HetNet may be configured to provide a service through a first wireless communication environment, e.g., a cellular network, and to maintain the service when switching to another communication environment, e.g., WLAN. The HetNet architecture may enable utilizing a mixture of wireless communication environments, e.g., a WLAN environment and a cellular environment, for example, to optimally respond to rapid changes in customer demand, reduce power consumption, reduce cost, increase efficiency and/or achieve any other benefit.

In one example, system 100 may utilize a Multi-tier, Multi-Radio Access Technology (Multi-RAT) Het-Net architecture, including a tier of small cells, e.g., pico, femto, relay stations, WiFi APs, and the like, overlaid on top of a macro cellular deployment to augment network capacity.

In another example, system 100 may utilize Multi-RAT small cells integrating multiple radios such as WiFi and 3GPP air interfaces in a single infrastructure device.

In other embodiments, system 100 may implement any other architecture and/or deployment.

In some demonstrative embodiments, UE 102 may also include, for example, one or more of a processor 124, an input unit 116, an output unit 118, a memory unit 120, and a storage unit 122. UE 102 may optionally include other suitable hardware components and/or software components. In some demonstrative embodiments, some or all of the components of UE 102 may be enclosed in a common housing or packaging, and may be interconnected or operably associated using one or more wired or wireless links.

In some demonstrative embodiments, ANDSF server 162 may also include, for example, a processor 172 and/or a memory unit 171. ANDSF server 162 may optionally include other suitable hardware components and/or software components. In some demonstrative embodiments, some or all of the components of ANDSF server 162 may be enclosed in a common housing or packaging, and may be interconnected or operably associated using one or more wired or wireless links. In other embodiments, components of MME 162 may be distributed among multiple or separate devices.

Processor 124 and/or processor 172 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 124 executes instructions, for example, of an Operating System (OS) of UE 102 and/or of one or more suitable applications. Processor 172 executes instructions, for example, of an Operating System (OS) of ANDSF server 162 and/or of one or more suitable applications.

Input unit 116 includes, for example, a keyboard, a keypad, a mouse, a touch-screen, a touch-pad, a track-ball, a stylus, a microphone, or other suitable pointing device or input device. Output unit 118 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by UE 102. Memory unit 171 may store, for example, data processed by ANDSF server 162.

In some demonstrative embodiments, eNB 104, WLAN AP 106, and/or UE 102 may be configured to enable a tightly coupled cellular-WLAN interworking system architecture, e.g., as described below.

In some embodiments, eNB 104 and WLAN AP 106 may be implemented in the form of a coupled eNB/AP.

In some demonstrative embodiments, the coupled eNB/AP may include eNB circuitry configured to perform the functionality of eNB 104, and WLAN AP circuitry, e.g., AP circuitry configured to perform the functionality of WLAN AP 106.

In some embodiments, eNB 104 and WLAN AP 106 may be implemented as part of a common device, e.g., an integrated eNB/AP device. In other embodiments, eNB 104 and WLAN AP 106 may be implemented as separate and/or independent units or devices. For example, the coupled eNB/AP may include separate eNB and AP devices, which may be coupled together.

In other embodiments, system 100 may implement any other architecture and/or deployment.

In some demonstrative embodiments, eNB 104, WLAN AP 106, and/or UE 102 may be configured to communicate according to a cellular/WLAN protocol aggregation scheme (also referred to as cellular/WLAN aggregation"), e.g., as described below.

In some demonstrative embodiments, the cellular/WLAN aggregation scheme may include, for example, an LTE/WLAN aggregation scheme, for example, if system 100 includes an LTE cellular system.

In other embodiments, the cellular/WLAN aggregation scheme may include any other cellular/WLAN aggregation scheme, for example, if system 100 includes any other cellular system.

In some demonstrative embodiments, LTE/WLAN protocol stack aggregation may be configured to enable LTE interworking with a WLAN protocol stack.

In some demonstrative embodiments, the LTE/WLAN protocol stack aggregation may be configured to anchor WLAN mobility at eNB 104.

In some demonstrative embodiments, a WLAN link between UE 102 and WLAN AP 106 may be aggregated above a MAC layer.

In some demonstrative embodiments, the LTE/WLAN protocol stack aggregation may be configured to aggregate the WLAN protocol stack above an LTE Packet Data Convergence Protocol (PDCP) layer.

In some demonstrative embodiments, the LTE protocol stack aggregation may be configured to aggregate the WLAN protocol stack below the LTE PDCP layer.

In some demonstrative embodiments, the LTE/WLAN protocol stack aggregation may include an encapsulation protocol, which may be configured to encapsulate messages between UE 102 and eNB 104, for example, via a tunnel, which may be set up between UE 102 and eNB 104, for example through WLAN AP 106.

In some demonstrative embodiments, eNB 104 and/or UE 102 may be configured to use a control protocol, for example, a Radio Resource Control (RRC) protocol and/or any other protocol, for example, to enable UE 102 and WLAN AP 106 to discover one another, and to set up and/or establish a WLAN link between UE 102 and WLAN AP 106.

In some demonstrative embodiments, UE 102, eNB 104, and/or WLAN AP 106 may be configured to enable UE 102 to operate at a cellular/WLAN aggregation mode, e.g., according to the cellular/WLAN aggregation scheme. For example, UE 102, eNB 104, and/or WLAN AP 106 may be configured to enable UE 102 to operate at a LTE/WLAN aggregation mode, e.g., according to the LTE/WLAN aggregation scheme.

In some demonstrative embodiments, UE 102 may receive from eNB 104 an indication, e.g., via RRC signaling, to indicate to UE 102 to use a WLAN in a cellular/WLAN aggregation mode.

In some demonstrative embodiments, UE 102 may be configured to operate at an ANDSF mode, in which, for example, communication of UE 102 with the WLAN may be controlled, for example, based on an ANDSF policy from ANDSF server 162.

In some demonstrative embodiments, when operating at the cellular/WLAN aggregation mode, the WLAN communication between UE 102 and WLAN AP 106 may be, for example, fully controlled by the cellular network, e.g., the LTE network.

In some demonstrative embodiments, at the cellular/WLAN aggregation mode, UE 102 may communicate with a WLAN access device, e.g., WLAN AP 106, anchored at a cellular node, e.g., eNB 104.

In some demonstrative embodiments, when operating at the cellular/WLAN aggregation mode, UE 102 may be able to perform WLAN communication, for example, even without the need to use the services of ANDSF server 162.

In some demonstrative embodiments, in some scenarios, use-cases and/or implementations, there may be a need to resolve one or more potential coexistence issues, for example, between the cellular/WLAN aggregation scheme and the ANDSF scheme, e.g., as described below.

In some implementations, for example, some operators may deploy network elements to support an ANDSF scheme, for example, prior to deploying network elements to support a LTE/WLAN aggregation scheme. Accordingly, there may be coexistence issues, which need to be resolved, for example, during an upgrade from the ANDSF scheme to the LTE/WLAN aggregation scheme.

In some implementations, for example, some operators may deploy network elements to support LTE/WLAN aggregation, for example, in one or more certain areas, while deploying one or more network elements supporting ANDSF, for example, in one or more, e.g., different, areas. In one example, the LTE/WLAN aggregation may be supported in dense areas, and/or 3rd party WLAN service providers with ANDSF may be used in some other areas.

In some implementations, for example, a UE, e.g., UE 102, may have ANDSF policies, and may roam into a network, which may deploy LTE/WLAN aggregation.

In some implementations, for example, some operators may deploy network elements supporting a RAN-based LTE/WAN aggregation, for example, as well as EPC-based Seamless WLAN offload, e.g., Wi-Fi Offload, e.g. S2a/S2b/S2, in the same area. For example, ANDSF may be used to control which mode a UE should operate in.

Some demonstrative embodiments may be configured to enable resolving one or more potential coexistence issues, for example, between the cellular/WLAN aggregation scheme and the ANDSF scheme, in the implementations listed above and/or in any other scenarios, use-cases and/or implementations.

Some demonstrative embodiments may be configured to resolve LTE/WLAN aggregation and ANDSF coexistence issues, for example, by configuring LTE/WLAN aggregation to take precedence over ANDSF policies, for example, to always take precedence over ANDSF policies, e.g., as described below.

Some demonstrative embodiments may be configured to resolve LTE/WLAN aggregation and ANDSF coexistence issues, for example, by configuring a UE, e.g., UE 102, which may have an active ANDSF policy, such that the ANDSF policy takes precedence over LTE/WLAN aggregation, for example, such that the ANDSF policy always takes precedence over LTE/WLAN aggregation, e.g., as described below.

According to these embodiments, the LTE/WLAN aggregation may be used by the UE, for example, only when the UE has no valid ANDSF policy.

Some demonstrative embodiments may be configured to resolve LTE/WLAN aggregation and ANDSF coexistence issues, for example, by enhancing ANDSF policies to enable signaling a preference and/or priority between multiple WLAN mobility schemes, e.g., as described below.

In some demonstrative embodiments, ANDSF server 162 may be configured to generate an ANDSF policy, which may be configured to enable an operator to control and/or signal to a UE, for example, when and/or for which UEs LTE/WLAN aggregation is preferable over ANDSF, and/or vise versa, e.g., as described below.

In some demonstrative embodiments, ANDSF server 162 may be configured to generate an ANDSF policy, which may be configured to enable an operator to control a mode of operation of a UE, for example, when both RAN-based LTE/WLAN aggregation and ANDSF-based mobility, e.g., EPC-based seamless Wi-Fi offload (S2a/S2b/S2c), are supported in the same area, e.g., as described below.

In some demonstrative embodiments, UE 102 may include a controller 145, which may be configured to control a WLAN mobility mode of operation of UE 102, e.g., as described below.

In some demonstrative embodiments, controller 145 may include or may be implemented using suitable circuitry and/or logic, e.g., controller circuitry and/or logic, processor circuitry and/or logic, memory circuitry and/or logic, and/or any other circuitry and/or logic, which may be configured to perform at least part of the functionality of controller 145. Additionally or alternatively, one or more functionalities of controller 145 may be implemented by logic, which may be executed by a machine and/or one or more processors, e.g., as described below.

In some demonstrative embodiments, controller 145 may select the WLAN mobility mode to include a cellular/WLAN aggregation mode, e.g., an LTE/WLAN aggregation mode, or an ANDSF mode, e.g., as described below.

In some demonstrative embodiments, controller 145 may cause UE 102 to communicate with a WLAN, e.g., WLAN AP 106, according to the selected WLAN mobility mode, as determined by controller 145, e.g., as described below.

In some demonstrative embodiments, at the cellular/WLAN aggregation mode, controller 145 may control communication of UE 102 with a WLAN access device, e.g., WLAN AP 106, anchored at a cellular node, e.g., eNB 104, for example, as described above.

In some demonstrative embodiments, at the ANDSF mode, controller 145 may control communication of UE 102 with the WLAN, for example, based on an ANDSF policy from an ANDSF server, e.g., ANDSF server 162.

In some demonstrative embodiments, controller 145 may be configured to select the WLAN mobility mode from the cellular/WLAN aggregation mode and the ANDSF mode, for example, based on a preconfigured selection criterion, e.g., as described below.

In some demonstrative embodiments, the preconfigured selection criterion may be configured such that the cellular/WLAN aggregation mode may take precedence, e.g., may always take precedence, over the ANDSF mode, e.g., as described below.

In some demonstrative embodiments, the preconfigured selection criterion may include selecting the cellular/WLAN aggregation mode over the ANDSF mode, for example, when UE 102 is instructed by a cellular node, e.g., eNB 104, to use the cellular/WLAN aggregation mode.

In some demonstrative embodiments, controller 145 may be configured to disable an indication of WLAN presence to ANDSF client 148, for example, when the cellular/WLAN aggregation mode is selected.

In one example, controller 145 may cause UE 102 to avoid informing ANDSF client 148 about WLAN network presence, for example, if the network, e.g., eNB 104, instructs UE 102 to use WLAN in aggregation mode. According to this example, from a perspective of ANDSF client 148, UE 102 would not detect any WLAN networks that ANDSF client may use, for example, whenever LTE/WLAN aggregation is used.

In some demonstrative embodiments, the preconfigured selection criterion may be configured such that the ANDSF mode may take precedence, e.g., may always take precedence, over the cellular/WLAN aggregation mode, e.g., as described below.

In some demonstrative embodiments, the preconfigured selection criterion may include controller 145 selecting the ANDSF mode over the cellular/WLAN aggregation mode, for example, when ANDSF client 148 has an active ANDSF policy.

In some demonstrative embodiments, the preconfigured selection criterion may include controller 145 selecting the cellular/WLAN aggregation mode over the ANDSF mode, for example, only when ANDSF client 148 has no active ANDSF policy.

In some demonstrative embodiments, controller 145 may cause UE 102 to ignore an indication, e.g., an RRC indication, from RAN 119, e.g., from eNB 104, to use the WLAN in the LTE/WLAN aggregation mode, for example, if UE has an active ANDSF policy, and the preconfigured selection criterion is to select the cellular/WLAN aggregation mode over the ANDSF mode.

In some demonstrative embodiments, UE 102 and/or ANDSF server 162 may be configured to use an ANDSF policy, which may be configured to indicate a preference of the cellular/WLAN aggregation mode or the ANDSF mode, e.g., as described below.

In some demonstrative embodiments, ANDSF policy module 168 may be configured to generate a MO including an ANDSF node ("LTEWLANAggregationPreference") including a WLAN mobility mode preference configured to indicate whether ANDSF or LTE/WLAN Aggregation is to be preferred.

In one example, ANDSF policy module 168 may be configured to set the LTEWLANAggregationPreference indication to a first value, e.g., zero, to indicate that the ANDSF mobility mode is to be preferred over the cellular/WLAN aggregation mode; or to a second value, e.g., one, to indicate that the cellular/WLAN aggregation mode is to be preferred over the ANDSF mobility mode.

In some demonstrative embodiments, ANDSF client module 148 may receive from ANDSF server 162 the ANDSF MO including the WLAN mobility mode preference to indicate the preference between the cellular/WLAN aggregation mode and the ANDSF mode.

In some demonstrative embodiments, controller 145 may select between the cellular/WLAN aggregation mode and the ANDSF mode, for example, based on the WLAN mobility mode preference.

In some demonstrative embodiments, controller 145 may select the cellular/WLAN aggregation mode over the ANDSF mode, for example, when the WLAN mobility mode preference indicates that the cellular/WLAN aggregation mode is to be preferred, and UE 102 is instructed by eNB 104 to use the cellular/WLAN aggregation mode.

In some demonstrative embodiments, controller 145 may disable an indication of WLAN presence to the ANDSF client 148, for example, when the WLAN mobility mode preference indicates that the cellular/WLAN aggregation mode is to be preferred, and UE 102 is instructed by eNB 104 to use the cellular/WLAN aggregation mode.

In some demonstrative embodiments, controller 145 select the ANDSF mode over the cellular/WLAN aggregation mode, for example, when the WLAN mobility mode preference indicates that the ANDSF mode is to be preferred, and the ANDSF client 148 has an active ANDSF policy.

In some demonstrative embodiments, controller 145 may be configured to, when the WLAN mobility mode preference indicates that the ANDSF mode is to be preferred, select the cellular/WLAN aggregation mode over the ANDSF mode, for example, only when the ANDSF client 148 has no active ANDSF policy.

For example, UE 102 may receive from ANDSF server 162 an MO including the LTEWLANAggregationPreference indication set to 0, and UE 102 may have a valid ANDSF rule, e.g., a valid Inter-System Routing Policy (ISRP) or a valid Inter System Mobility Policy (ISMP). According to this example, controller 145 may be configured to cause UE 102 to route traffic according to ANDSF rule, and not to use LTE/WLAN aggregation. For example, controller 145 may cause UE 102 to report no WLAN measurements to eNB 104, and/or to prevent LTE/WLAN aggregation in any other way, e.g. by sending an appropriate indication to eNB 104.

In some demonstrative embodiments, ANDSF policy module 168 may be configured to determine an ANDSF MO including one or more ANDSF policies, the ANDSF MO including a WLAN mobility priority node, the WLAN mobility priority node including a WLAN mobility type indicator to indicate a cellular/WLAN aggregation mode, and a WLAN mobility priority value to indicate a priority of the cellular/WLAN aggregation mode, e.g., as described below.

In some demonstrative embodiments, the ANDSF MO may include an ANDSF node ("PrioritizedSeamlessWLAN-Mobility") to indicate which WLAN mobility mode, e.g. RAN-based LTE/WLAN aggregation, EPC-based (S2a/b/c) Seamless Wi-Fi offload, or any other mobility mode, that a UE, e.g., UE 102, is to select, for example, when multiple WLAN mobility modes are supported and/or available, for example, in the same area, e.g., as described below.

In some demonstrative embodiments, ANDSF server 162 may send the ANDSF MO to UE 102, and UE 102 may receive the ANDSF MO.

In some demonstrative embodiments, controller 145 may be configured to select between the cellular/WLAN aggregation mode and the ANDSF mode, for example, based on the WLAN mobility priority value, e.g., as described below.

In some demonstrative embodiments, ANDSF policy module 168 may set the WLAN mobility priority value to include a value within a predefined priority range, e.g., as described below.

In some demonstrative embodiments, the priority range may be, for example, between 1 and 250, e.g., as described below. In other embodiments, the priority range may include any other range of values.

In some demonstrative embodiments, ANDSF policy module 168 may set the ANDSF MO to include a plurality of WLAN mobility priority nodes to indicate priorities of a plurality of WLAN mobility modes, e.g., as described below.

In some demonstrative embodiments, ANDSF policy module 168 may set the ANDSF MO to include a first WLAN mobility priority node including a first WLAN mobility type indicator to indicate the cellular/WLAN aggregation mode and a first WLAN mobility priority value to indicate the priority of the cellular/WLAN aggregation mode.

In some demonstrative embodiments, ANDSF policy module 168 may set the ANDSF MO to include at least a second WLAN mobility priority node including a second WLAN mobility type indicator to indicate an ANDSF mode and a second WLAN mobility priority value to indicate a priority of the ANDSF mode.

In some demonstrative embodiments, ANDSF policy module 168 may set the first priority value to include a first value within the predefined priority range, and to set the second priority value to include a second value within the predefined priority range, to indicate that a UE, e.g., UE 102, is to select between the cellular/WLAN aggregation mode and the ANDSF mode, for example, based on a comparison between the first and second priority values, e.g., as described below.

In some demonstrative embodiments, controller 145 may be configured to select between the cellular/WLAN aggregation mode and the ANDSF mode, for example, based on a comparison between the WLAN mobility priority value of the cellular/WLAN aggregation mode, e.g., the first priority value, and the WLAN mobility priority value of the ANDSF mode, e.g., the second priority value.

In one example, controller 145 may be configured to select between the cellular/WLAN aggregation mode and the ANDSF mode, for example, by selecting the WLAN mobility mode corresponding to the lowest priority value between the first and second priority values, e.g., as described below.

In some demonstrative embodiments, ANDSF policy module 168 may set the WLAN mobility priority value to a predefined value ("the restrict-selection value") to indicate that UE 102 is to restrict selection of the cellular/WLAN aggregation mode.

In some demonstrative embodiments, the restrict-selection value may be 254, or any other value, e.g., which is not within the priority range.

In some demonstrative embodiments, controller 145 may be configured to restrict selection of the cellular/WLAN aggregation mode by UE 102, for example, when the WLAN mobility priority value includes the restrict-selection value.

In some demonstrative embodiments, ANDSF policy module 168 may set the WLAN mobility priority value to a predefined value ("the forbid-selection value") to indicate that UE 102 is forbidden to select the cellular/WLAN aggregation mode.

In some demonstrative embodiments, the forbid-selection value may be 255, or any other value, e.g., which is not within the priority range.

In some demonstrative embodiments, controller 145 may be configured to forbid selection of the cellular/WLAN aggregation mode by UE 102, for example, when the WLAN mobility priority value includes the forbid-selection value.

In some demonstrative embodiments, a roaming UE, e.g., UE 102, may have a valid ISRP or ISMP rule, e.g., from a Home Public Land Mobile Network (HPLMN). According to these embodiments, the roaming UE 102 may be configured to route traffic according to ANDSF.

For example, when UE 102 is roaming and ANDSF client 148 has a valid ISRP or ISMP rule, e.g., from a HPLMN, controller 145 may select the ANDSF mode over the cellular/WLAN aggregation mode. For example, controller 145 may cause UE 102 to ignore an indication, e.g., an RRC indication, from RAN 119, e.g., from eNB 104, to use the WLAN in the LTE/WLAN aggregation mode.

Figure 2:
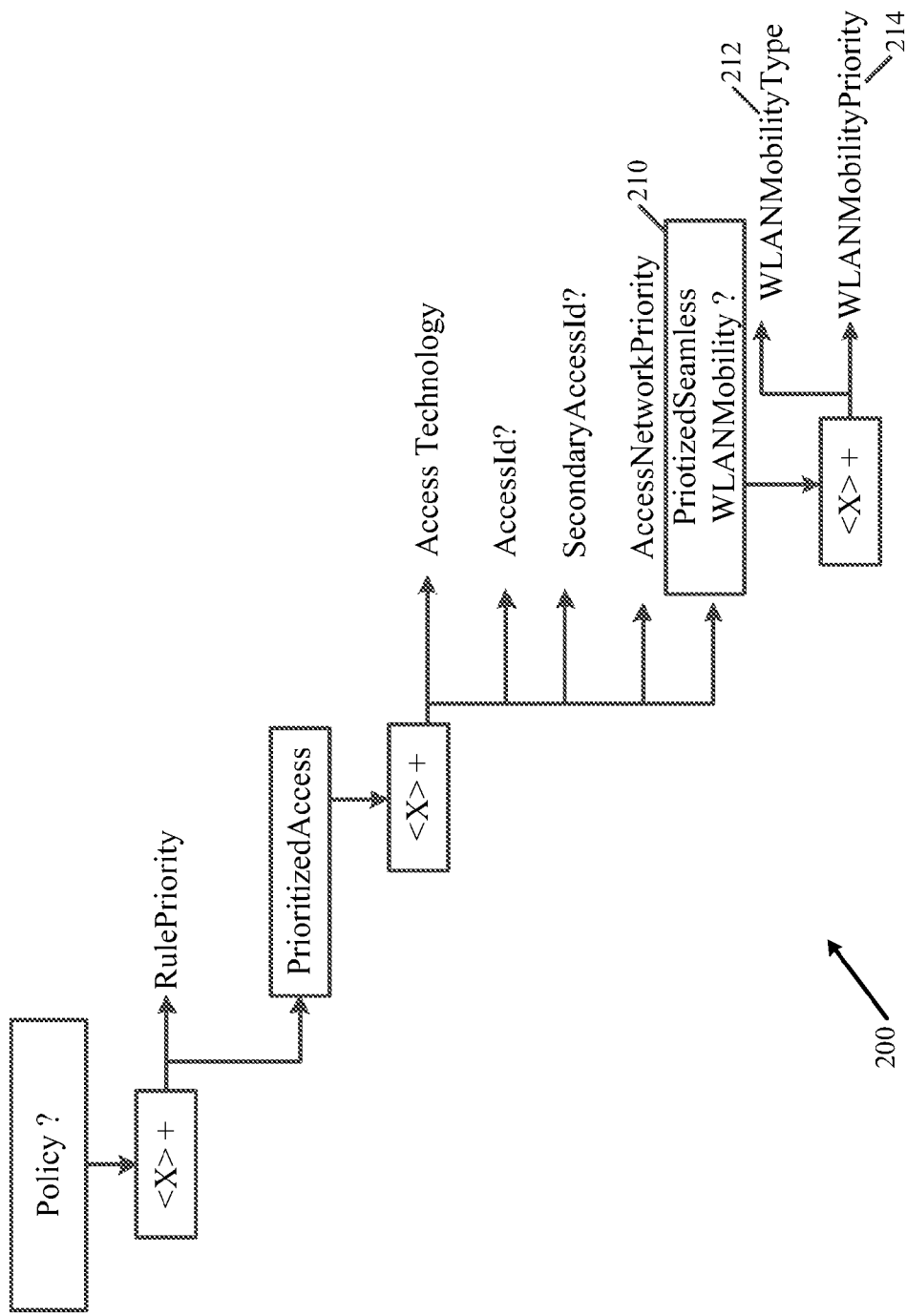
FIG. 2 is a schematic illustration of a policy node sub-object of an Access Network Discovery and Selection Function (ANDSF) Management Object (MO), in accordance with some demonstrative embodiments.

FIG. 2 is a schematic illustration of a policy node sub-object 200 of an ANDSF MO, in accordance with some demonstrative embodiments. For example, node-sub object 200 may be included in an ANDSF MO generated by ANDSF policy module 168 (FIG. 1), an ANDSF MO sent by ANDSF server 162 (FIG. 1), and/or an ANDSF MO received by UE 102 (FIG. 1).

In some demonstrative embodiments, node sub-object 200 may include a WLAN mobility priority node ("PrioritizedSeamlessWLANMobility") 210 to indicate a priority and/or preference between a plurality of WLAN mobility modes, e.g., as described below.

In some demonstrative embodiments, the WLAN mobility priority node 210 may act as a placeholder for parameters defining priorities of one or more WLAN mobility modes.

In one example, WLAN mobility priority node 210 may be defined, e.g., as follows:
<X>/Policy/<X>/PrioritizedAccess/PrioritizedSeamlessWLANMobility
Occurrence: ZeroOrOneOrMore
Format: node
Access Types: Get, Replace
Values: N/A In some demonstrative embodiments, node 210 may include a WLAN mobility type indicator (leaf) ("WLANMobilityType") 212 to indicate a WLAN mobility mode that a WLAN may support.

In one example, leaf 212 may be defined, e.g., as follows:
X>/Policy/<X>/PrioritizedAccess/PrioritizedSeamlessWLANMobility/WLANMobi lityType
Occurrence: One
Format: int
Access Types: Get, Replace
Values: <WLAN mobility type>.

In some demonstrative embodiments, the value of the WLAN mobility type leaf 212 may be set, for example, according to the following table, or according to any other predefined set of values:

TABLE 1

Possible values for the WLANMobilityType leaf

| Value | Description |
|---|---|
| 0 | Reserved |
| 1 | S2a based Seamless WLAN Offload (SaMOG) |
| 2 | RAN-based WLAN/3GPP link aggregation (aka eNB-anchored WLAN mobility) |
| 3 | S2b based Seamless WLAN Offload |
| 4 | S2c based Seamless WLAN Offload |
| 5-255 | Reserved |

In some demonstrative embodiments, node 210 may include a WLAN mobility priority indicator (leaf) ("WLANMobilityPriority") 214 to indicate a priority corresponding to the WLAN mobility mode type.

In one example, leaf 214 may be defined, e.g., as follows:
X>/Policy/<X>/PrioritizedAccess/PrioritizedSeamlessWLANMobility/WLANMobi lityType
Occurrence: One
Format: int
Access Types: Get, Replace
Values: <WLAN mobility priority>.

In some demonstrative embodiments, the value of the WLAN mobility priority leaf 214 may be set, for example, according to the following table, or according to any other predefined set of values:

TABLE 2

Values of WLANMobilityPriority leaf

| Value | Description |
|---|---|
| 0 | Reserved |
| 1-250 | Priority value |
| 251-253 | Reserved |
| 254 | Restricted access. This WLAN mobility type should be avoided if the current rule is active. |
| 255 | Forbidden. UE is not allowed to use this WLAN mobility type if the current rule is active. |

In some demonstrative embodiments, the value of WLAN mobility priority leaf 214 corresponding to a WLAN mobility mode type may be set to a value within the range of 1-250, for example, to indicate a priority of the WLAN mobility mode type, for example, relative to priorities of one or more other WLAN mobility mode types.

For example, ANDSF policy module 168 (FIG. 1) may generate an ANDSF MO including the node sub-object 200 including a first WLAN mobility node 210 including a first WLAN mobility type 212, e.g., cellular/WLAN aggregation, and a first priority value 214 within the range 1-250; and a second WLAN mobility node 210 including a second WLAN mobility type 212, e.g., S2aSeamless WLAN offload, and a second priority value 214 within the range 1-250.

According to this example, the first WLAN mobility type 212, e.g., cellular/WLAN aggregation, may be prioritized over the second WLAN mobility type 212, e.g., S2aSeamless WLAN offload, for example, if the first priority value is lesser than the second priority value.

In some demonstrative embodiments, controller 145 (FIG. 1) may be configured to select a WLAN mobility mode from a plurality of available WLAN mobility modes, for example, based on the node sub-object 200.

In some demonstrative embodiments, controller 145 (FIG. 1) may be configured to prioritize between a plurality of WLAN mobility types, for example, based on the priority values corresponding to the plurality of WLAN mobility types.

In one example, more than one WLAN mobility type may be available to UE 102 (FIG. 1). For example, node sub-object 200 may include a plurality of WLAN mobility priority nodes 210.

In one example, two or more WLAN mobility priority nodes 210 may include two or more respective priority WLAN mobility priority leafs 214 having priority values within the range 1-250.

According to this example, controller 145 (FIG. 1) may consider the WLAN mobility type, e.g., together with a corresponding access identifier if present, with the lowest WLANMobilityPriority value, as the WLAN mobility mode, e.g., together with the corresponding access identifier if present, having the highest priority, e.g., as defined in Table 2.

In some demonstrative embodiments, ANDSF policy module 268 may set the WLANMobilityPriority value 214 corresponding to a WLAN mobility mode indicated by WLAN mobility type 212 to a "restricted access" value, e.g., 254, to indicate the WLAN mobility mode should not be used by UE 102, for example, to indicate that controller 145 (FIG. 1) should avoid using the WLAN mobility mode, e.g., as described above.

In some demonstrative embodiments, ANDSF policy module 268 may set the WLANMobilityPriority value 214 corresponding to a WLAN mobility mode indicated by WLAN mobility type 212 to a "forbidden access" value, e.g., 255, to indicate the WLAN mobility mode shall not be used by UE 102, for example, to indicate that controller 145 (FIG. 1) is forbidden from using the WLAN mobility mode, e.g., as described above.

In some demonstrative embodiments, the same WLAN-MobilityPriority value may be used for more than one WLAN mobility type.

In some demonstrative embodiments, more than one WLAN mobility type with the same value of the WLAN-MobilityPriority may be available for UE 102 (FIG. 1). According to these embodiments, controller 145 (FIG. 1) may be configured to select for UE 102 (FIG. 1) one of the available WLAN mobility types, for example, in an implementation dependent way.

Figure 3:
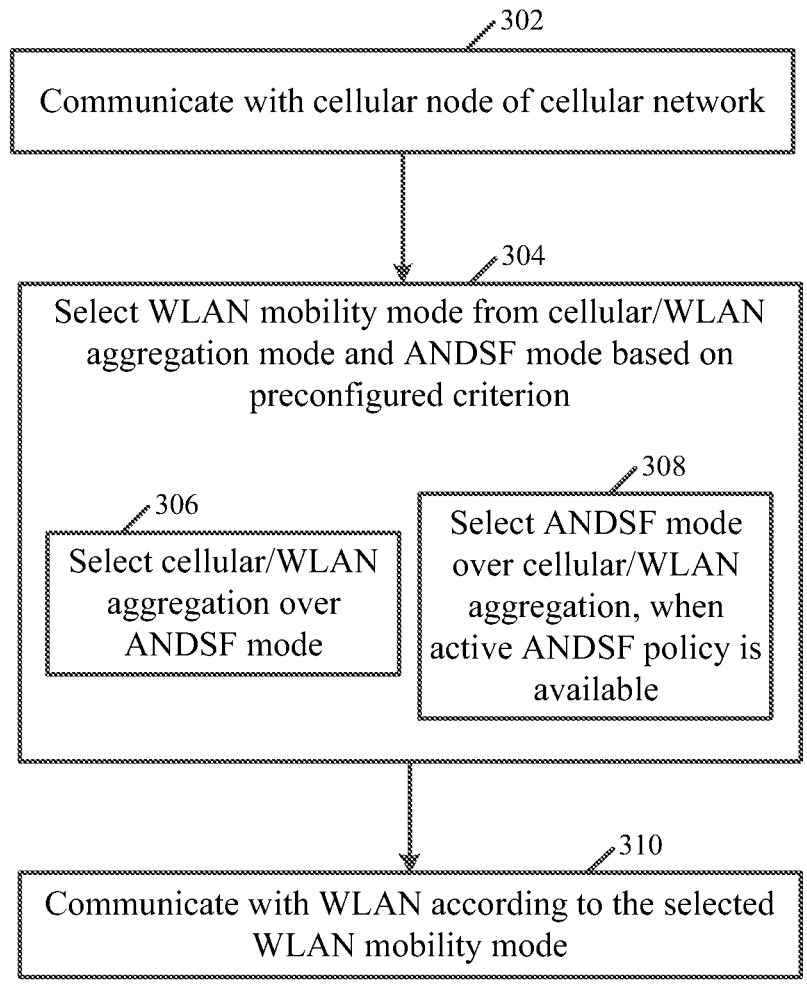
FIG. 3 is a schematic flow-chart illustration of a method of selecting a mobility mode of a User Equipment (UE), in accordance with some demonstrative embodiments.

FIG. 3 is a schematic flow-chart illustration of a method of selecting a mobility mode of a UE, in accordance with some demonstrative embodiments. In some embodiments, one or more of the operations of the method of FIG. 3 may be performed by a wireless communication system e.g., system 100 (FIG. 1); a UE, e.g., UE 102 (FIG. 1); and/or a controller, e.g., controller 145 (FIG. 1).

As indicated at block 302, the method may include communicating with a cellular node of a cellular network. For example, UE 102 (FIG. 1) may communicate with eNB 104 (FIG. 1), e.g., as described above.

As indicated at block 304, the method may include selecting a WLAN mobility mode from a cellular/WLAN aggregation mode and an ANDSF mode based on a preconfigured selection criterion. For example, controller 145 (FIG. 1) may select between the cellular/WLAN aggregation mode and the ANDSF mode based on a preconfigured selection criterion, e.g., as described above.

As indicated at block 306, selecting the WLAN mobility mode based on the preconfigured selection criterion may include selecting the cellular/WLAN aggregation mode over the ANDSF mode, when the UE is instructed by the cellular node to use the cellular/WLAN aggregation mode. For example, controller 145 (FIG. 1) may select the cellular/WLAN aggregation mode over the ANDSF mode, for example, when UE 102 (FIG. 1) is instructed by eNB 104 (FIG. 1) to use the cellular/WLAN aggregation mode As indicated at block 308, selecting the WLAN mobility mode based on the preconfigured selection criterion may include selecting the ANDSF mode over the cellular/WLAN aggregation mode, when an active ANDSF policy is available. For example, controller 145 (FIG. 1) may select the ANDSF mode over the cellular/WLAN aggregation mode, for example, when ANDSF client 148 (FIG. 1) has an active ANDSF policy available, e.g., as described above.

As indicated at block 310, the method may include communicating with a WLAN according to the WLAN mobility mode. For example, controller 145 (FIG. 1) cause UE (FIG. 1) to communicate with a WLAN according to the WLAN mobility mode, e.g., as described above.

Figure 4:
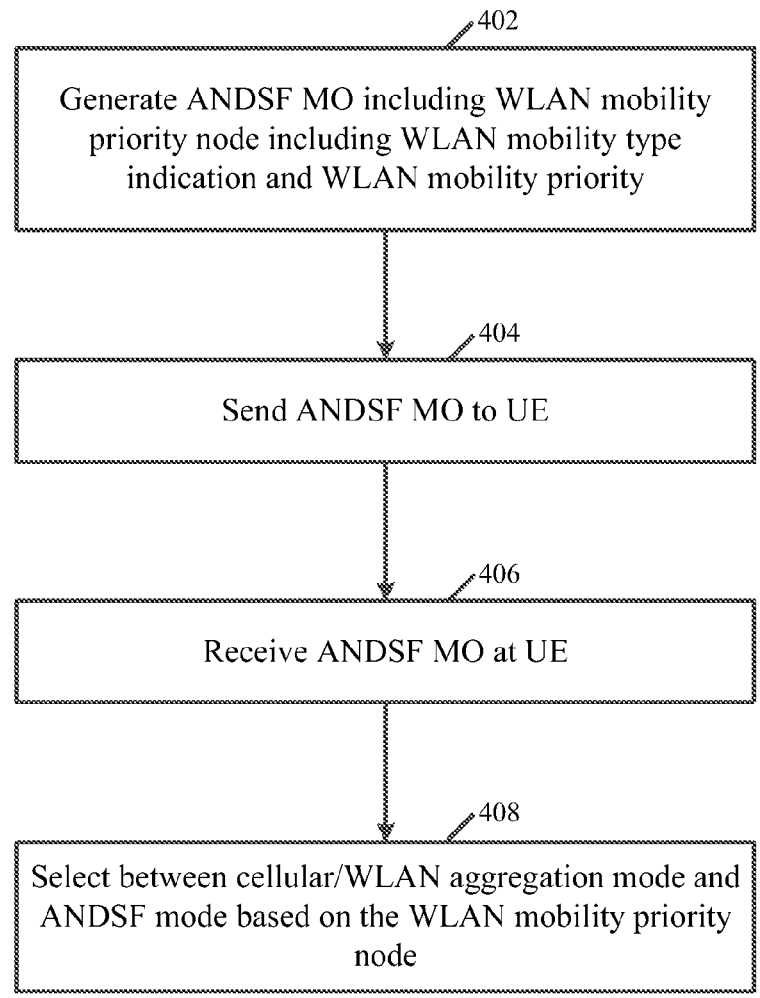
FIG. 4 is a schematic flow-chart illustration of a method of selecting a mobility mode of a UE, in accordance with some demonstrative embodiments.

FIG. 4 is a schematic flow-chart illustration of a method of selecting a mobility mode of a UE, in accordance with some demonstrative embodiments. In some embodiments, one or more of the operations of the method of FIG. 4 may be performed by a wireless communication system e.g., system 100 (FIG. 1); a UE, e.g., UE 102 (FIG. 1); an ANDSF server, e.g., ANDSF server 162 (FIG. 1); an ANDSF policy module, e.g., ANDSF policy module 168 (FIG. 1); and/or a controller, e.g., controller 145 (FIG. 1).

As indicated at block 402, the method may include generating an ANDSF MO including one or more ANDSF policies, the ANDSF MO including a WLAN mobility priority node, the WLAN mobility priority node including a WLAN mobility type indicator to indicate a cellular/WLAN aggregation mode, and a WLAN mobility priority value to indicate a priority of the cellular/WLAN aggregation mode. For example, ANDSF policy module may generate the ANDSF MO including one or more WLAN mobility priority nodes 210 (FIG. 1), e.g., as described above.

As indicated at block 404, the method may include send the ANDSF MO to a UE. For example, ANDSF server 162 may send the ANDSF Mo to UE 102 (FIG. 1), e.g., as described above.

As indicated at block 406, the method may include receiving the ANDSF Mo at the UE. For example, ANDSF client module 148 (FIG. 1) may receive the ANDSF Mo from ANDSF server 162 (FIG. 1), e.g., as described above.

As indicated at block 408, the method may include selecting between the cellular/WLAN aggregation mode and an ANDSF mode based on the WLAN mobility priority value. For example, controller 145 (FIG. 1) may select between the cellular/WLAN aggregation mode and an ANDSF mode, for example, based on the WLAN mobility priority value, e.g., as described above.

Figure 5:
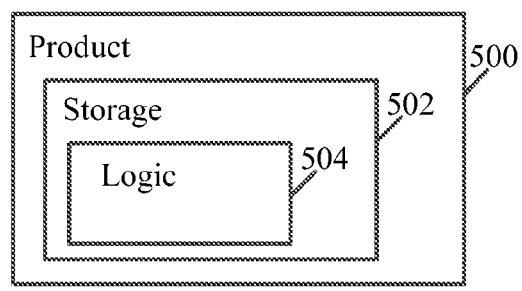
FIG. 5 is a schematic illustration of a product, in accordance with some demonstrative embodiments.

Reference is made to FIG. 5, which schematically illustrates a product of manufacture 500, in accordance with some demonstrative embodiments. Product 500 may include a non-transitory machine-readable storage medium 502 to store logic 504, which may be used, for example, to perform at least part of the functionality of UE 102 (FIG. 1), eNB 104 (FIG. 1), node B 196 (FIG. 1), ANDSF server 162 (FIG. 1), controller 145 (FIG. 1), and/or ANDSF policy module 168 (FIG. 1), and/or to perform one or more operations of the methods of FIGS. 3 and/or 4. The phrase "non-transitory machine-readable medium" is directed to include all computer-readable media, with the sole exception being a transitory propagating signal.

In some demonstrative embodiments, product 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a User Equipment (UE) comprising a Wireless Local Area Network (WLAN) transceiver; a cellular transceiver to communicate with a cellular node; an Access Network Discovery and Selection Function (ANDSF) client module to communicate with an ANDSF server; and a controller to select a WLAN mobility mode from a cellular/WLAN aggregation mode and an ANDSF mode based on a preconfigured selection criterion, and to cause the UE to communicate with a WLAN according to the WLAN mobility mode.

Example 2 includes the subject matter of Example 1, and optionally, wherein the preconfigured selection criterion comprises selecting the cellular/WLAN aggregation mode over the ANDSF mode, when the UE is instructed by the cellular node to use the cellular/WLAN aggregation mode.

Example 3 includes the subject matter of Example 1 or 2, and optionally, wherein the controller is to disable an indication of WLAN presence to the ANDSF client, when the cellular/WLAN aggregation mode is selected.

Example 4 includes the subject matter of Example 1, and optionally, wherein the preconfigured selection criterion comprises selecting the ANDSF mode over the cellular/WLAN aggregation mode, when the ANDSF client has an active ANDSF policy.

Example 5 includes the subject matter of Example 1, and optionally, wherein the preconfigured selection criterion comprises selecting the cellular/WLAN aggregation mode over the ANDSF mode, only when the ANDSF client has no active ANDSF policy.

Example 6 includes the subject matter of any one of Examples 1-5, and optionally, wherein at the cellular/WLAN aggregation mode the controller is to control communication of the UE with a WLAN access device anchored at the cellular node.

Example 7 includes the subject matter of any one of Examples 1-6, and optionally, wherein at the ANDSF mode the controller is to control communication of the UE with the WLAN based on an ANDSF policy from the ANDSF server.

Example 8 includes the subject matter of any one of Examples 1-7, and optionally, including one or more antennas, a memory and a processor.

Example 9 includes a User Equipment (UE) comprising a Wireless Local Area Network (WLAN) transceiver; a cellular transceiver to communicate with a cellular node; an Access Network Discovery and Selection Function (ANDSF) client module to receive a Management Object (MO) from an ANDSF server, the MO including a WLAN mobility priority node including a WLAN mobility type indicator to indicate a cellular/WLAN aggregation mode, and a WLAN mobility priority value to indicate a priority of the cellular/WLAN aggregation mode; and a controller to select between the cellular/WLAN aggregation mode and an ANDSF mode based on the WLAN mobility priority value.

Example 10 includes the subject matter of Example 9, and optionally, wherein, when the WLAN mobility priority value includes a value within a predefined priority range, the controller is to select between the cellular/WLAN aggregation mode and the ANDSF mode based on a comparison between the WLAN mobility priority value of the cellular/WLAN aggregation mode, and a WLAN mobility priority value of the ANDSF mode.

Example 11 includes the subject matter of Example 10, and optionally, wherein the priority range is between 1 and 250.

Example 12 includes the subject matter of any one of Examples 9-11, and optionally, wherein the controller is restrict selection of the cellular/WLAN aggregation mode, when the WLAN mobility priority value includes a predefined value.

Example 13 includes the subject matter of Example 12, and optionally, wherein the predefined value is 254.

Example 14 includes the subject matter of any one of Examples 9-13, and optionally, wherein the controller is to forbid selection of the cellular/WLAN aggregation mode, when the WLAN mobility priority value includes a predefined value.

Example 15 includes the subject matter of Example 14, and optionally, wherein the predefined value is 255.

Example 16 includes the subject matter of any one of Examples 9-15, and optionally, including one or more antennas, a memory and a processor.

Example 17 includes an Access Network Discovery and Selection Function (ANDSF) server comprising an ANDSF policy module to determine an ANDSF Management Object (MO) including one or more ANDSF policies, the ANDSF MO including a Wireless Local Area Network (WLAN) mobility priority node, the WLAN mobility priority node including a WLAN mobility type indicator to indicate a cellular/WLAN aggregation mode, and a WLAN mobility priority value to indicate a priority of the cellular/WLAN aggregation mode; and a communication interface to send the ANDSF MO to a User Equipment (UE).

Example 18 includes the subject matter of Example 17, and optionally, wherein the ANDSF policy module is to set the ANDSF MO to include a first WLAN mobility priority node including a first WLAN mobility type indicator to indicate the cellular/WLAN aggregation mode and a first WLAN mobility priority value to indicate the priority of the cellular/WLAN aggregation mode, and at least a second WLAN mobility priority node including a second WLAN mobility type indicator to indicate an ANDSF mode and a second WLAN mobility priority value to indicate a priority of the ANDSF mode.

Example 19 includes the subject matter of Example 18, and optionally, wherein the ANDSF policy module is to set the first priority value to include a first value within a predefined priority range, and to set the second priority value to include a second value within the predefined priority range, to indicate that the UE is to select between the cellular/WLAN aggregation mode and the ANDSF mode based on a comparison between the first and second priority values.

Example 20 includes the subject matter of Example 19, and optionally, wherein the priority range is between 1 and 250.

Example 21 includes the subject matter of any one of Examples 17-20, and optionally, wherein the ANDSF policy module is to set the WLAN mobility priority value to a predefined value to indicate that the UE is to restrict selection of the cellular/WLAN aggregation mode.

Example 22 includes the subject matter of Example 21, and optionally, wherein the predefined value is 254.

Example 23 includes the subject matter of any one of Examples 17-22, and optionally, wherein the ANDSF policy module is to set the WLAN mobility priority value to a predefined value to indicate that the UE is forbidden to select the cellular/WLAN aggregation mode.

Example 24 includes the subject matter of Example 23, and optionally, wherein the predefined value is 255.

Example 25 includes the subject matter of any one of Examples 17-24, and optionally, comprising a memory and a processor.

Example 26 includes a User Equipment (UE) comprising a Wireless Local Area Network (WLAN) transceiver; a cellular transceiver to communicate with a cellular node; an Access Network Discovery and Selection Function (ANDSF) client module to receive a Management Object (MO) from an ANDSF server, the MO including a WLAN mobility mode preference to indicate preference between a cellular/WLAN aggregation mode and an ANDSF mode; and a controller to select between the cellular/WLAN aggregation mode and the ANDSF mode based on the WLAN mobility mode preference.

Example 27 includes the subject matter of Example 26, and optionally, wherein the controller is to select the cellular/WLAN aggregation mode over the ANDSF mode, when the WLAN mobility mode preference indicates the cellular/WLAN aggregation mode is to be preferred, and the UE is instructed by the cellular node to use the cellular/WLAN aggregation mode.

Example 28 includes the subject matter of Example 26 or 27, and optionally, wherein the controller is to disable an indication of WLAN presence to the ANDSF client, when the WLAN mobility mode preference indicates the cellular/WLAN aggregation mode is to be preferred, and the UE is instructed by the cellular node to use the cellular/WLAN aggregation mode.

Example 29 includes the subject matter of any one of Examples 26-28, and optionally, wherein the controller is to select the ANDSF mode over the cellular/WLAN aggregation mode, when the WLAN mobility mode preference indicates the ANDSF mode is to be preferred, and the ANDSF client has an active ANDSF policy.

Example 30 includes the subject matter of any one of Examples 26-29, and optionally, wherein, when the WLAN mobility mode preference indicates the ANDSF mode is to be preferred, the controller is to select the cellular/WLAN aggregation mode over the ANDSF mode, only when the ANDSF client has no active ANDSF policy.

Example 31 includes the subject matter of any one of Examples 26-30, and optionally, including one or more antennas, a memory and a processor.

Example 32 includes a method to be performed by a User Equipment (UE), the method comprising communicating with a cellular node; selecting a Wireless Local Area Network (WLAN) mobility mode from a cellular/WLAN aggregation mode and an Access Network Discovery and Selection Function (ANDSF) mode based on a preconfigured selection criterion; and communicating with a WLAN according to the WLAN mobility mode.

Example 33 includes the subject matter of Example 32, and optionally, wherein the preconfigured selection criterion comprises selecting the cellular/WLAN aggregation mode over the ANDSF mode, when the UE is instructed by the cellular node to use the cellular/WLAN aggregation mode.

Example 34 includes the subject matter of Example 32 or 33, and optionally, comprising disabling an indication of WLAN presence to an ANDSF client, when the cellular/WLAN aggregation mode is selected.

Example 35 includes the subject matter of Example 32, and optionally, wherein the preconfigured selection criterion comprises selecting the ANDSF mode over the cellular/WLAN aggregation mode, when an active ANDSF policy is available at the UE.

Example 36 includes the subject matter of Example 32, and optionally, wherein the preconfigured selection criterion comprises selecting the cellular/WLAN aggregation mode over the ANDSF mode, only when the UE has no active ANDSF policy.

Example 37 includes the subject matter of any one of Examples 32-36, and optionally, comprising, at the cellular/WLAN aggregation mode, controlling communication of the UE with a WLAN access device anchored at the cellular node.

Example 38 includes the subject matter of any one of Examples 32-37, and optionally, comprising, at the ANDSF mode, controlling communication of the UE with the WLAN based on an ANDSF policy from the ANDSF server.

Example 39 includes a method to be performed by a User Equipment (UE), the method comprising receiving a Management Object (MO) from an Access Network Discovery and Selection Function (ANDSF) server, the MO including a WLAN mobility priority node including a Wireless Local Area Network (WLAN) mobility type indicator to indicate a cellular/WLAN aggregation mode, and a WLAN mobility priority value to indicate a priority of the cellular/WLAN aggregation mode; selecting between the cellular/WLAN aggregation mode and an ANDSF mode based on the WLAN mobility priority value; and communicating with a WLAN according to the WLAN mobility mode.

Example 40 includes the subject matter of Example 39, and optionally, comprising, when the WLAN mobility priority value includes a value within a predefined priority range, selecting between the cellular/WLAN aggregation mode and the ANDSF mode based on a comparison between the WLAN mobility priority value of the cellular/WLAN aggregation mode, and a WLAN mobility priority value of the ANDSF mode.

Example 41 includes the subject matter of Example 40, and optionally, wherein the priority range is between 1 and 250.

Example 42 includes the subject matter of any one of Examples 39-41, and optionally, comprising restricting selection of the cellular/WLAN aggregation mode, when the WLAN mobility priority value includes a predefined value.

Example 43 includes the subject matter of Example 42, and optionally, wherein the predefined value is 254.

Example 44 includes the subject matter of any one of Examples 39-43, and optionally, comprising forbidding selection of the cellular/WLAN aggregation mode, when the WLAN mobility priority value includes a predefined value.

Example 45 includes the subject matter of Example 44, and optionally, wherein the predefined value is 255.

Example 46 includes a method to be performed by an Access Network Discovery and Selection Function (ANDSF) server, the method comprising determining an ANDSF Management Object (MO) including one or more ANDSF policies, the ANDSF MO including a Wireless Local Area Network (WLAN) mobility priority node, the WLAN mobility priority node including a WLAN mobility type indicator to indicate a cellular/WLAN aggregation mode, and a WLAN mobility priority value to indicate a priority of the cellular/WLAN aggregation mode; and sending the ANDSF MO to a User Equipment (UE).

Example 47 includes the subject matter of Example 46, and optionally, comprising setting the ANDSF MO to include a first WLAN mobility priority node including a first WLAN mobility type indicator to indicate the cellular/WLAN aggregation mode and a first WLAN mobility priority value to indicate the priority of the cellular/WLAN aggregation mode, and at least a second WLAN mobility priority node including a second WLAN mobility type indicator to indicate an ANDSF mode and a second WLAN mobility priority value to indicate a priority of the ANDSF mode.

Example 48 includes the subject matter of Example 47, and optionally, comprising setting the first priority value to include a first value within a predefined priority range, and setting the second priority value to include a second value within the predefined priority range, to indicate that the UE is to select between the cellular/WLAN aggregation mode and the ANDSF mode based on a comparison between the first and second priority values.

Example 49 includes the subject matter of Example 48, and optionally, wherein the priority range is between 1 and 250.

Example 50 includes the subject matter of Example 46, and optionally, comprising setting the WLAN mobility priority value to a predefined value to indicate that the UE is to restrict selection of the cellular/WLAN aggregation mode.

Example 51 includes the subject matter of Example 50, and optionally, wherein the predefined value is 254.

Example 52 includes the subject matter of Example 46, and optionally, comprising setting the WLAN mobility priority value to a predefined value to indicate that the UE is forbidden to select the cellular/WLAN aggregation mode.

Example 53 includes the subject matter of Example 52, and optionally, wherein the predefined value is 255.

Example 54 includes a method to be performed at a User Equipment (UE), the method comprising receiving a Management Object (MO) from an Access Network Discovery and Selection Function (ANDSF) server, the MO including a Wireless Local Area Network (WLAN) mobility mode preference to indicate preference between a cellular/WLAN aggregation mode and an ANDSF mode; and selecting between the cellular/WLAN aggregation mode and the ANDSF mode based on the WLAN mobility mode preference.

Example 55 includes the subject matter of Example 54, and optionally, comprising selecting the cellular/WLAN aggregation mode over the ANDSF mode, when the WLAN mobility mode preference indicates the cellular/WLAN aggregation mode is to be preferred, and the UE is instructed by a cellular node to use the cellular/WLAN aggregation mode.

Example 56 includes the subject matter of Example 54 or 55, and optionally, comprising disabling an indication of WLAN presence to an ANDSF client, when the WLAN mobility mode preference indicates the cellular/WLAN aggregation mode is to be preferred, and the UE is instructed by a cellular node to use the cellular/WLAN aggregation mode.

Example 57 includes the subject matter of any one of Examples 54-56, and optionally, comprising selecting the ANDSF mode over the cellular/WLAN aggregation mode, when the WLAN mobility mode preference indicates the ANDSF mode is to be preferred, and an active ANDSF policy is available at the UE.

Example 58 includes the subject matter of any one of Examples 54-57, and optionally, comprising, when the WLAN mobility mode preference indicates the ANDSF mode is to be preferred, selecting the cellular/WLAN aggregation mode over the ANDSF mode, only when no active ANDSF policy is available at the UE.

Example 59 includes a product including one or more tangible computer-readable non-transitory storage media comprising computer-executable instructions operable to, when executed by at least one computer processor, enable the at least one computer processor to implement a method at a User Equipment (UE), the method comprising communicating with a cellular node; selecting a Wireless Local Area Network (WLAN) mobility mode from a cellular/WLAN aggregation mode and an Access Network Discovery and Selection Function (ANDSF) mode based on a preconfigured selection criterion; and communicating with a WLAN according to the WLAN mobility mode.

Example 60 includes the subject matter of Example 59, and optionally, wherein the preconfigured selection criterion comprises selecting the cellular/WLAN aggregation mode over the ANDSF mode, when the UE is instructed by the cellular node to use the cellular/WLAN aggregation mode.

Example 61 includes the subject matter of Example 59 or 60, and optionally, wherein the method comprises disabling an indication of WLAN presence to an ANDSF client, when the cellular/WLAN aggregation mode is selected.

Example 62 includes the subject matter of Example 59, and optionally, wherein the preconfigured selection criterion comprises selecting the ANDSF mode over the cellular/WLAN aggregation mode, when an active ANDSF policy is available at the UE.

Example 63 includes the subject matter of Example 59, and optionally, wherein the preconfigured selection criterion comprises selecting the cellular/WLAN aggregation mode over the ANDSF mode, only when the UE has no active ANDSF policy.

Example 64 includes the subject matter of any one of Examples 59-63, and optionally, wherein the method comprises, at the cellular/WLAN aggregation mode, controlling communication of the UE with a WLAN access device anchored at the cellular node.

Example 65 includes the subject matter of any one of Examples 59-64, and optionally, wherein the method comprises, at the ANDSF mode, controlling communication of the UE with the WLAN based on an ANDSF policy from the ANDSF server.

Example 66 includes a product including one or more tangible computer-readable non-transitory storage media comprising computer-executable instructions operable to, when executed by at least one computer processor, enable the at least one computer processor to implement a method at a User Equipment (UE), the method comprising receiving a Management Object (MO) from an Access Network Discovery and Selection Function (ANDSF) server, the MO including a WLAN mobility priority node including a Wireless Local Area Network (WLAN) mobility type indicator to indicate a cellular/WLAN aggregation mode, and a WLAN mobility priority value to indicate a priority of the cellular/WLAN aggregation mode; selecting between the cellular/WLAN aggregation mode and an ANDSF mode based on the WLAN mobility priority value; and communicating with a WLAN according to the WLAN mobility mode.

Example 67 includes the subject matter of Example 66, and optionally, wherein the method comprises, when the WLAN mobility priority value includes a value within a predefined priority range, selecting between the cellular/WLAN aggregation mode and the ANDSF mode based on a comparison between the WLAN mobility priority value of the cellular/WLAN aggregation mode, and a WLAN mobility priority value of the ANDSF mode.

Example 68 includes the subject matter of Example 67, and optionally, wherein the priority range is between 1 and 250.

Example 69 includes the subject matter of any one of Examples 66-68, and optionally, wherein the method comprises restricting selection of the cellular/WLAN aggregation mode, when the WLAN mobility priority value includes a predefined value.

Example 70 includes the subject matter of Example 69, and optionally, wherein the predefined value is 254.

Example 71 includes the subject matter of any one of Examples 66-70, and optionally, wherein the method comprises forbidding selection of the cellular/WLAN aggregation mode, when the WLAN mobility priority value includes a predefined value.

Example 72 includes the subject matter of Example 71, and optionally, wherein the predefined value is 255.

Example 73 includes a product including one or more tangible computer-readable non-transitory storage media comprising computer-executable instructions operable to, when executed by at least one computer processor, enable the at least one computer processor to implement a method at an Access Network Discovery and Selection Function (ANDSF) server, the method comprising determining an ANDSF Management Object (MO) including one or more ANDSF policies, the ANDSF MO including a Wireless Local Area Network (WLAN) mobility priority node, the WLAN mobility priority node including a WLAN mobility type indicator to indicate a cellular/WLAN aggregation mode, and a WLAN mobility priority value to indicate a priority of the cellular/WLAN aggregation mode; and sending the ANDSF MO to a User Equipment (UE).

Example 74 includes the subject matter of Example 73, and optionally, wherein the method comprises setting the ANDSF MO to include a first WLAN mobility priority node including a first WLAN mobility type indicator to indicate the cellular/WLAN aggregation mode and a first WLAN mobility priority value to indicate the priority of the cellular/WLAN aggregation mode, and at least a second WLAN mobility priority node including a second WLAN mobility type indicator to indicate an AND SF mode and a second WLAN mobility priority value to indicate a priority of the ANDSF mode.

Example 75 includes the subject matter of Example 74, and optionally, wherein the method comprises setting the first priority value to include a first value within a predefined priority range, and setting the second priority value to include a second value within the predefined priority range, to indicate that the UE is to select between the cellular/WLAN aggregation mode and the ANDSF mode based on a comparison between the first and second priority values.

Example 76 includes the subject matter of Example 75, and optionally, wherein the priority range is between 1 and 250.

Example 77 includes the subject matter of Example 73, and optionally, wherein the method comprises setting the WLAN mobility priority value to a predefined value to indicate that the UE is to restrict selection of the cellular/WLAN aggregation mode.

Example 78 includes the subject matter of Example 77, and optionally, wherein the predefined value is 254.

Example 79 includes the subject matter of Example 73, and optionally, wherein the method comprises setting the WLAN mobility priority value to a predefined value to indicate that the UE is forbidden to select the cellular/WLAN aggregation mode.

Example 80 includes the subject matter of Example 79, and optionally, wherein the predefined value is 255.

Example 81 includes a product including one or more tangible computer-readable non-transitory storage media comprising computer-executable instructions operable to, when executed by at least one computer processor, enable the at least one computer processor to implement a method at a User Equipment (UE), the method comprising receiving a Management Object (MO) from an Access Network Discovery and Selection Function (ANDSF) server, the MO including a Wireless Local Area Network (WLAN) mobility mode preference to indicate preference between a cellular/WLAN aggregation mode and an ANDSF mode; and selecting between the cellular/WLAN aggregation mode and the ANDSF mode based on the WLAN mobility mode preference.

Example 82 includes the subject matter of Example 81, and optionally, wherein the method comprises selecting the cellular/WLAN aggregation mode over the ANDSF mode, when the WLAN mobility mode preference indicates the cellular/WLAN aggregation mode is to be preferred, and the UE is instructed by a cellular node to use the cellular/WLAN aggregation mode.

Example 83 includes the subject matter of Example 81 or 82, and optionally, wherein the method comprises disabling an indication of WLAN presence to an ANDSF client, when the WLAN mobility mode preference indicates the cellular/WLAN aggregation mode is to be preferred, and the UE is instructed by a cellular node to use the cellular/WLAN aggregation mode.

Example 84 includes the subject matter of any one of Examples 81-83, and optionally, wherein the method comprises selecting the ANDSF mode over the cellular/WLAN aggregation mode, when the WLAN mobility mode preference indicates the ANDSF mode is to be preferred, and an active ANDSF policy is available at the UE.

Example 85 includes the subject matter of any one of Examples 81-84, and optionally, wherein the method comprises, when the WLAN mobility mode preference indicates the ANDSF mode is to be preferred, selecting the cellular/WLAN aggregation mode over the ANDSF mode, only when no active ANDSF policy is available at the UE.

Example 86 includes an apparatus of communicating by a User Equipment (UE), the apparatus comprising means for communicating with a cellular node; means for selecting a Wireless Local Area Network (WLAN) mobility mode from a cellular/WLAN aggregation mode and an Access Network Discovery and Selection Function (ANDSF) mode based on a preconfigured selection criterion; and means for communicating with a WLAN according to the WLAN mobility mode.

Example 87 includes the subject matter of Example 86, and optionally, wherein the preconfigured selection criterion comprises selecting the cellular/WLAN aggregation mode over the ANDSF mode, when the UE is instructed by the cellular node to use the cellular/WLAN aggregation mode.

Example 88 includes the subject matter of Example 86 or 87, and optionally, comprising means for disabling an indication of WLAN presence to an ANDSF client, when the cellular/WLAN aggregation mode is selected.

Example 89 includes the subject matter of Example 86, and optionally, wherein the preconfigured selection criterion comprises selecting the ANDSF mode over the cellular/WLAN aggregation mode, when an active ANDSF policy is available at the UE.

Example 90 includes the subject matter of Example 86, and optionally, wherein the preconfigured selection criterion comprises selecting the cellular/WLAN aggregation mode over the ANDSF mode, only when the UE has no active ANDSF policy.

Example 91 includes the subject matter of any one of Examples 86-90, and optionally, comprising means for, at the cellular/WLAN aggregation mode, controlling communication of the UE with a WLAN access device anchored at the cellular node.

Example 92 includes the subject matter of any one of Examples 86-91, and optionally, comprising means for, at the ANDSF mode, controlling communication of the UE with the WLAN based on an ANDSF policy from the ANDSF server.

Example 93 includes an apparatus of communicating by a User Equipment (UE), the apparatus comprising means for receiving a Management Object (MO) from an Access Network Discovery and Selection Function (ANDSF) server, the MO including a WLAN mobility priority node including a Wireless Local Area Network (WLAN) mobility type indicator to indicate a cellular/WLAN aggregation mode, and a WLAN mobility priority value to indicate a priority of the cellular/WLAN aggregation mode; means for selecting between the cellular/WLAN aggregation mode and an ANDSF mode based on the WLAN mobility priority value; and means for communicating with a WLAN according to the WLAN mobility mode.

Example 94 includes the subject matter of Example 93, and optionally, comprising means for, when the WLAN mobility priority value includes a value within a predefined priority range, selecting between the cellular/WLAN aggregation mode and the ANDSF mode based on a comparison between the WLAN mobility priority value of the cellular/WLAN aggregation mode, and a WLAN mobility priority value of the ANDSF mode.

Example 95 includes the subject matter of Example 94, and optionally, wherein the priority range is between 1 and 250.

Example 96 includes the subject matter of Example 93, and optionally, comprising means for restricting selection of the cellular/WLAN aggregation mode, when the WLAN mobility priority value includes a predefined value.

Example 97 includes the subject matter of Example 96, and optionally, wherein the predefined value is 254.

Example 98 includes the subject matter of any one of Examples 93-97, and optionally, comprising means for forbidding selection of the cellular/WLAN aggregation mode, when the WLAN mobility priority value includes a predefined value.

Example 99 includes the subject matter of Example 98, and optionally, wherein the predefined value is 255.

Example 100 includes an apparatus of providing an Access Network Discovery and Selection Function (ANDSF) service by an ANDSF server, the apparatus comprising means for determining an ANDSF Management Object (MO) including one or more ANDSF policies, the ANDSF MO including a Wireless Local Area Network (WLAN) mobility priority node, the WLAN mobility priority node including a WLAN mobility type indicator to indicate a cellular/WLAN aggregation mode, and a WLAN mobility priority value to indicate a priority of the cellular/WLAN aggregation mode; and means for sending the ANDSF MO to a User Equipment (UE).

Example 101 includes the subject matter of Example 100, and optionally, comprising means for setting the ANDSF MO to include a first WLAN mobility priority node including a first WLAN mobility type indicator to indicate the cellular/WLAN aggregation mode and a first WLAN mobility priority value to indicate the priority of the cellular/WLAN aggregation mode, and at least a second WLAN mobility priority node including a second WLAN mobility type indicator to indicate an ANDSF mode and a second WLAN mobility priority value to indicate a priority of the ANDSF mode.

Example 102 includes the subject matter of Example 101, and optionally, comprising means for setting the first priority value to include a first value within a predefined priority range, and setting the second priority value to include a second value within the predefined priority range, to indicate that the UE is to select between the cellular/WLAN aggregation mode and the ANDSF mode based on a comparison between the first and second priority values.

Example 103 includes the subject matter of Example 102, and optionally, wherein the priority range is between 1 and 250.

Example 104 includes the subject matter of Example 100, and optionally, comprising means for setting the WLAN mobility priority value to a predefined value to indicate that the UE is to restrict selection of the cellular/WLAN aggregation mode.

Example 105 includes the subject matter of Example 104, and optionally, wherein the predefined value is 254.

Example 106 includes the subject matter of Example 100, and optionally, comprising means for setting the WLAN mobility priority value to a predefined value to indicate that the UE is forbidden to select the cellular/WLAN aggregation mode.

Example 107 includes the subject matter of Example 106, and optionally, wherein the predefined value is 255.

Example 108 includes an apparatus of communicating by a User Equipment (UE), the apparatus comprising means for receiving a Management Object (MO) from an Access Network Discovery and Selection Function (ANDSF) server, the MO including a Wireless Local Area Network (WLAN) mobility mode preference to indicate preference between a cellular/WLAN aggregation mode and an ANDSF mode; and means for selecting between the cellular/WLAN aggregation mode and the ANDSF mode based on the WLAN mobility mode preference.

Example 109 includes the subject matter of Example 108, and optionally, comprising means for selecting the cellular/WLAN aggregation mode over the ANDSF mode, when the WLAN mobility mode preference indicates the cellular/WLAN aggregation mode is to be preferred, and the UE is instructed by a cellular node to use the cellular/WLAN aggregation mode.

Example 110 includes the subject matter of Example 108 or 109, and optionally, comprising means for disabling an indication of WLAN presence to an ANDSF client, when the WLAN mobility mode preference indicates the cellular/WLAN aggregation mode is to be preferred, and the UE is instructed by a cellular node to use the cellular/WLAN aggregation mode.

Example 111 includes the subject matter of any one of Examples 108-110, and optionally, comprising means for selecting the ANDSF mode over the cellular/WLAN aggregation mode, when the WLAN mobility mode preference indicates the ANDSF mode is to be preferred, and an active ANDSF policy is available at the UE.

Example 112 includes the subject matter of any one of Examples 108-111, and optionally, comprising means for, when the WLAN mobility mode preference indicates the ANDSF mode is to be preferred, selecting the cellular/WLAN aggregation mode over the ANDSF mode, only when no active ANDSF policy is available at the UE.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A User Equipment (UE) comprising:
   a Wireless Local Area Network (WLAN) transceiver;
   a cellular transceiver to communicate with a cellular node;
   an Access Network Discovery and Selection Function (ANDSF) client module to receive a Management Object (MO) from an ANDSF server, the MO including a WLAN mobility priority node including a WLAN mobility type indicator to indicate a cellular/WLAN aggregation mode, and a WLAN mobility preference value to indicate a preference of the cellular/WLAN aggregation mode relative to an ANDSF mode; and
   a controller to select between the cellular/WLAN aggregation mode and the ANDSF mode based on the WLAN mobility preference value when the WLAN mobility preference value is not within a predefined priority range, wherein the controller is to select between the cellular/WLAN aggregation mode and the ANDSF mode based on a comparison between the WLAN mobility preference value and a preference value of the ANDSF mode when the WLAN mobility preference value is within the predefined priority range.

2. The UE of claim 1, wherein the priority range is between 1 and 250.

3. The UE of claim 1, wherein the controller is to restrict selection of the cellular/WLAN aggregation mode, when the WLAN mobility preference value includes a predefined value.

4. The UE of claim 3, wherein said predefined value is 254.

5. The UE of claim 1, wherein the controller is to forbid selection of the cellular/WLAN aggregation mode, when the WLAN mobility preference value includes a predefined value.

6. The UE of claim 5, wherein said predefined value is 255.

7. The UE of claim 1 including one or more antennas, a memory and a processor.

8. An Access Network Discovery and Selection Function (ANDSF) server comprising:
   an ANDSF policy module to determine an ANDSF Management Object (MO) including one or more ANDSF policies, the ANDSF MO including a Wireless Local Area Network (WLAN) mobility priority node, the WLAN mobility priority node including a WLAN mobility type indicator to indicate a cellular/WLAN aggregation mode, and a WLAN mobility preference value to indicate a preference of the cellular/WLAN aggregation mode, the ANDSF policy module to set the WLAN mobility preference value to a value which is not within a predefined priority range when selection between the cellular/WLAN aggregation mode and an ANDSF mode is to be based on the WLAN mobility preference value, the ANDSF policy module to set the WLAN mobility preference value to a value within the predefined priority range when selection between the cellular/WLAN aggregation mode and the ANDSF mode is to be based on a comparison between the WLAN mobility preference value and a preference value of the ANDSF mode; and
  a communication interface to send the ANDSF MO to a User Equipment (UE).

9. The ANDSF server of claim 8, wherein the ANDSF policy module is to set the ANDSF MO to include a first WLAN mobility priority node including a first WLAN mobility type indicator to indicate the cellular/WLAN aggregation mode and a first WLAN mobility preference value to indicate the preference of the cellular/WLAN aggregation mode, and at least a second WLAN mobility priority node including a second WLAN mobility type indicator to indicate the ANDSF mode and a second WLAN mobility preference value to indicate a preference of the ANDSF mode.

10. The ANDSF server of claim 9, wherein the ANDSF policy module is to set the first preference value to include a first value within the predefined priority range, and to set the second preference value to include a second value within the predefined priority range, to indicate that the UE is to select between the cellular/WLAN aggregation mode and the ANDSF mode based on a comparison between the first and second preference values.

11. The ANDSF server of claim 8, wherein the ANDSF policy module is to set the WLAN mobility preference value to a predefined value to indicate that the UE is to restrict selection of the cellular/WLAN aggregation mode.

12. The ANDSF server of claim 8, wherein the ANDSF policy module is to set the WLAN mobility preference value to a predefined value to indicate that the UE is forbidden to select the cellular/WLAN aggregation mode.

13. A product including one or more tangible computer-readable non-transitory storage media comprising computer-executable instructions operable to, when executed by at least one computer processor, enable the at least one computer processor to cause a User Equipment (UE) to:

receive a Management Object (MO) from an Access Network Discovery and Selection Function (ANDSF) server, the MO including a Wireless Local Area Network (WLAN) mobility type indicator to indicate a cellular/WLAN aggregation mode, and a WLAN mobility preference value to indicate a preference of the cellular/WLAN aggregation mode relative to an ANDSF mode;
  select between the cellular/WLAN aggregation mode and the ANDSF mode based on the WLAN mobility preference value, when the WLAN mobility preference value is not within a predefined priority range; and
  select between the cellular/WLAN aggregation mode and the ANDSF mode based on a comparison between the WLAN mobility preference value and a preference value of the ANDSF mode, when the WLAN mobility preference value is within the predefined priority range.

14. The product of claim 13, wherein the instructions, when executed, cause the UE to select the cellular/WLAN aggregation mode over the ANDSF mode, when the WLAN mobility preference value indicates said cellular/WLAN aggregation mode is to be preferred, and the UE is instructed by a cellular node to use the cellular/WLAN aggregation mode.

15. The product of claim 13, wherein the instructions, when executed, cause the UE to disable an indication of WLAN presence to an ANDSF client, when the WLAN mobility preference value indicates said cellular/WLAN aggregation mode is to be preferred, and the UE is instructed by a cellular node to use the cellular/WLAN aggregation mode.

16. The product of claim 13, wherein the instructions, when executed, cause the UE to select the ANDSF mode over the cellular/WLAN aggregation mode, when the WLAN mobility preference value indicates said ANDSF mode is to be preferred, and an active ANDSF policy is available at said UE.

* * * * *